Aug. 14, 1934.    T. P. MORRISON    1,970,053
FURNACE RETORT CLEANING MACHINE
Original Filed April 15, 1932    9 Sheets-Sheet 3
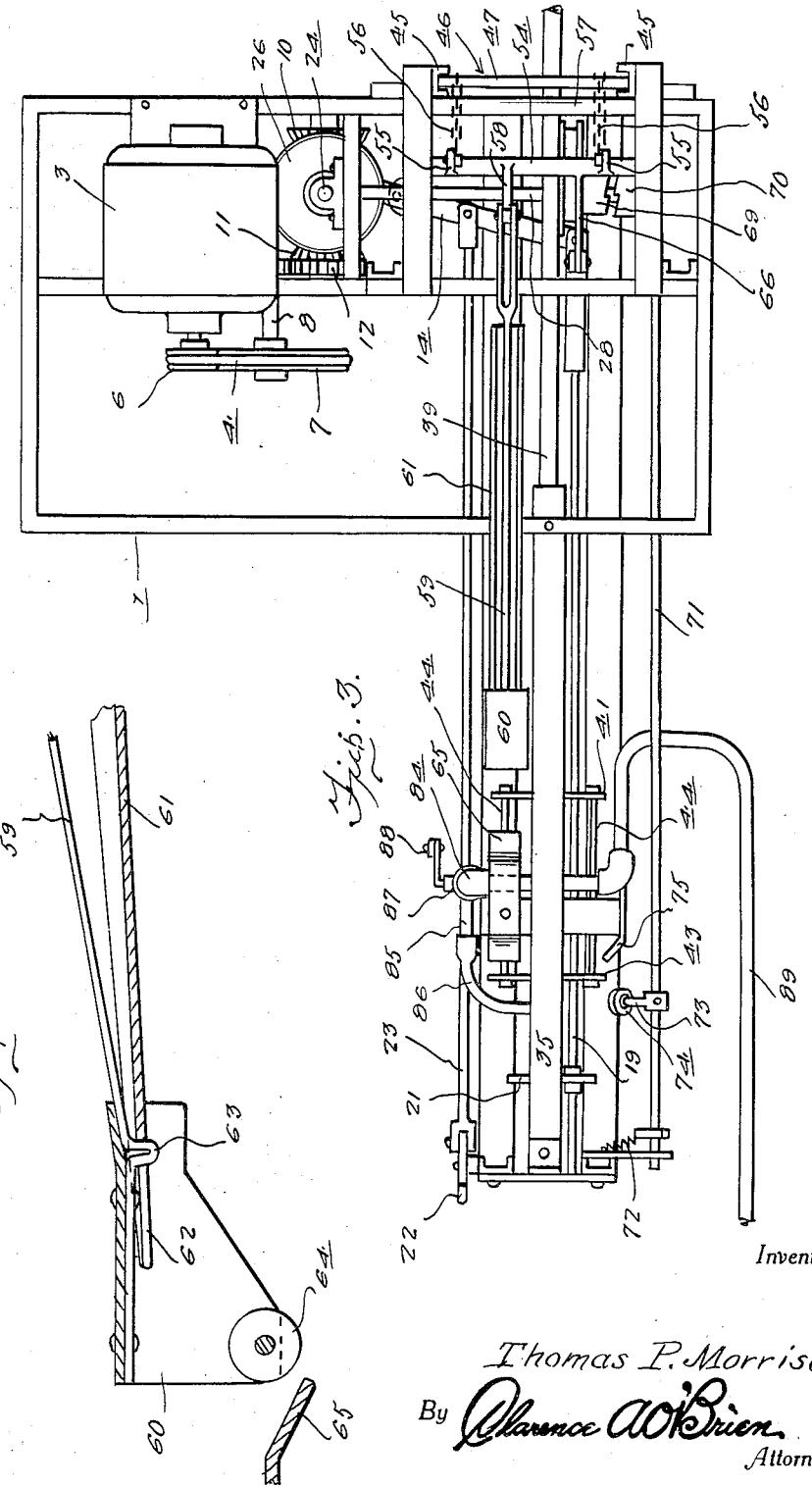
Inventor
*Thomas P. Morrison*
By *Clarence A. O'Brien*
Attorney

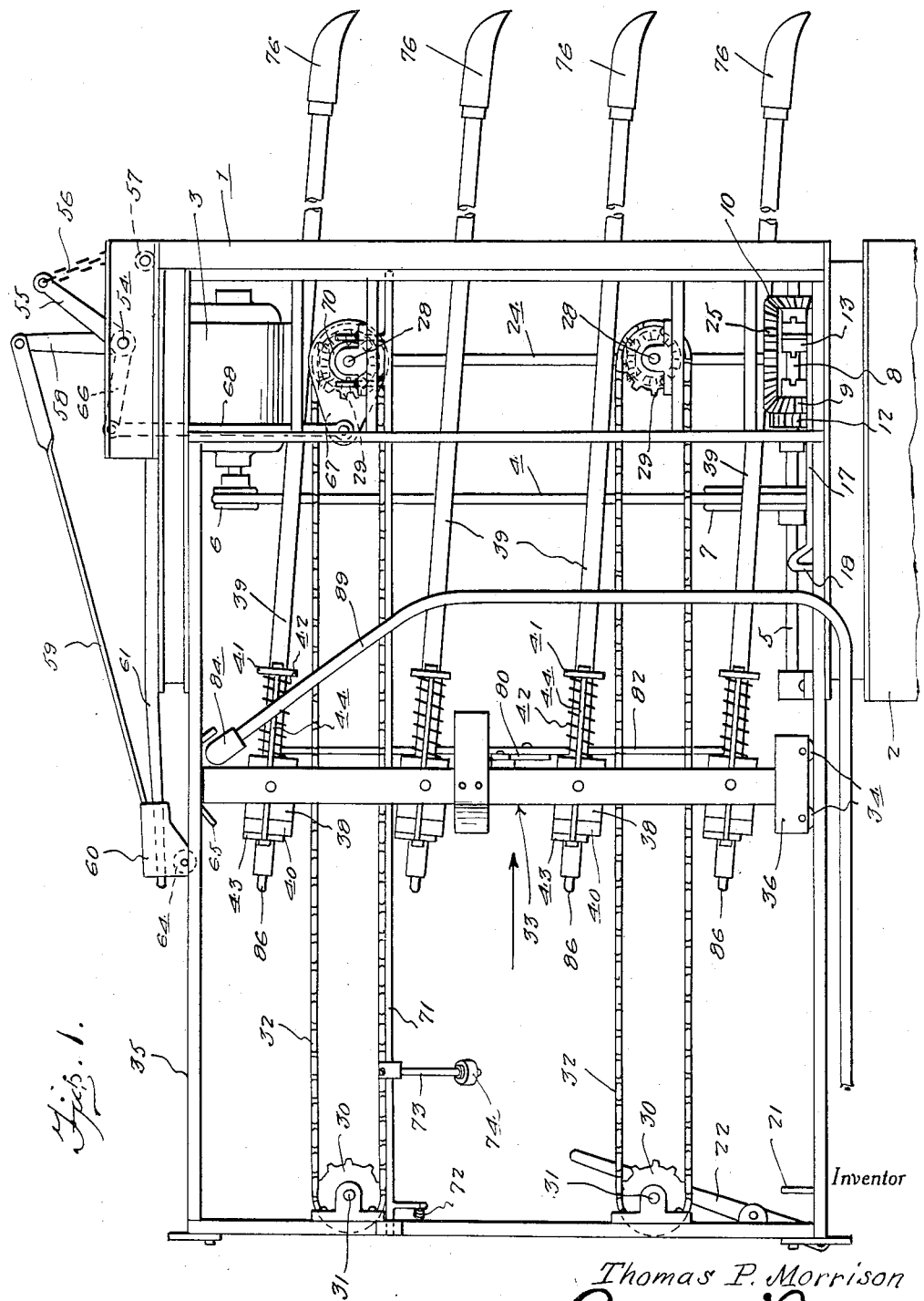

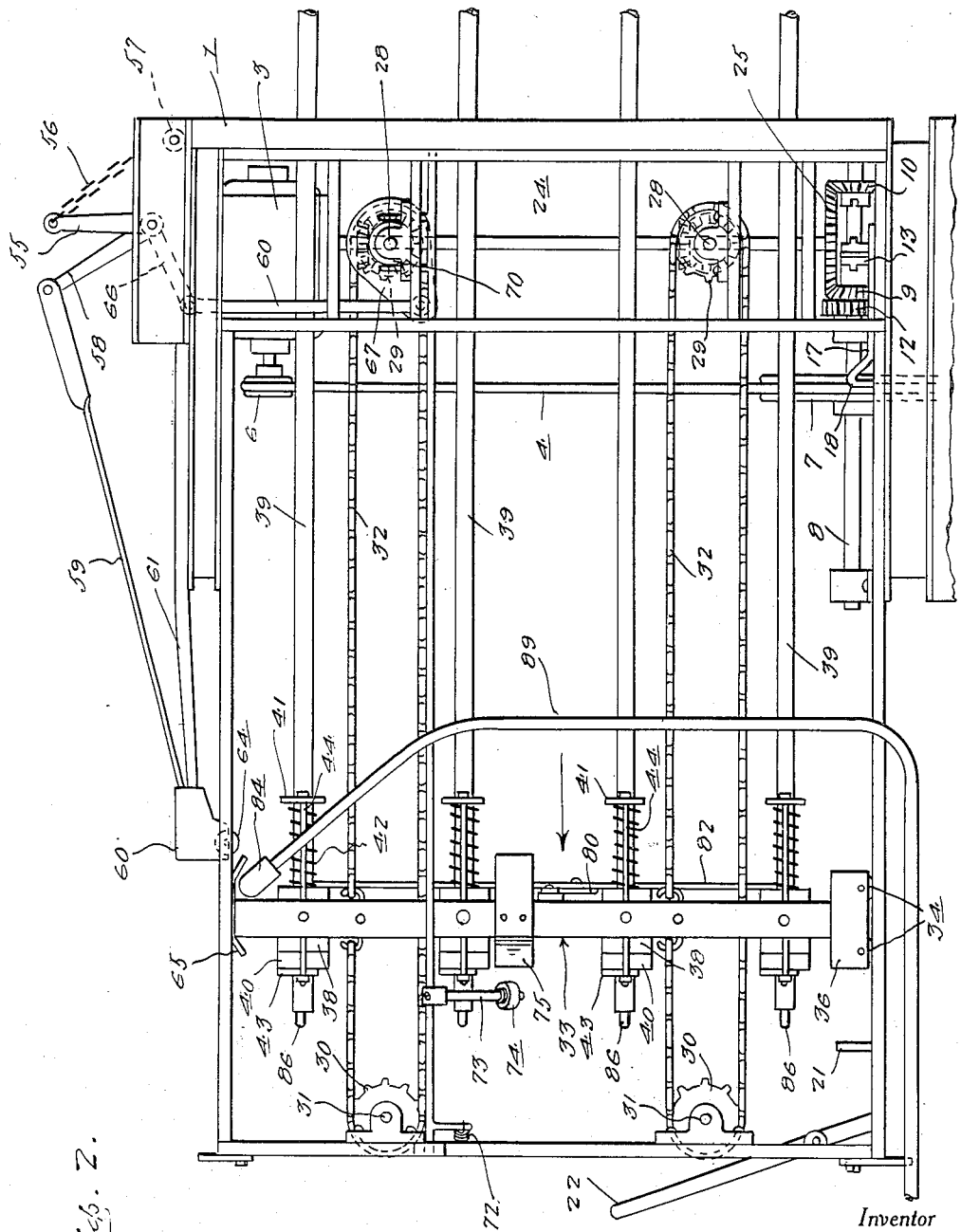

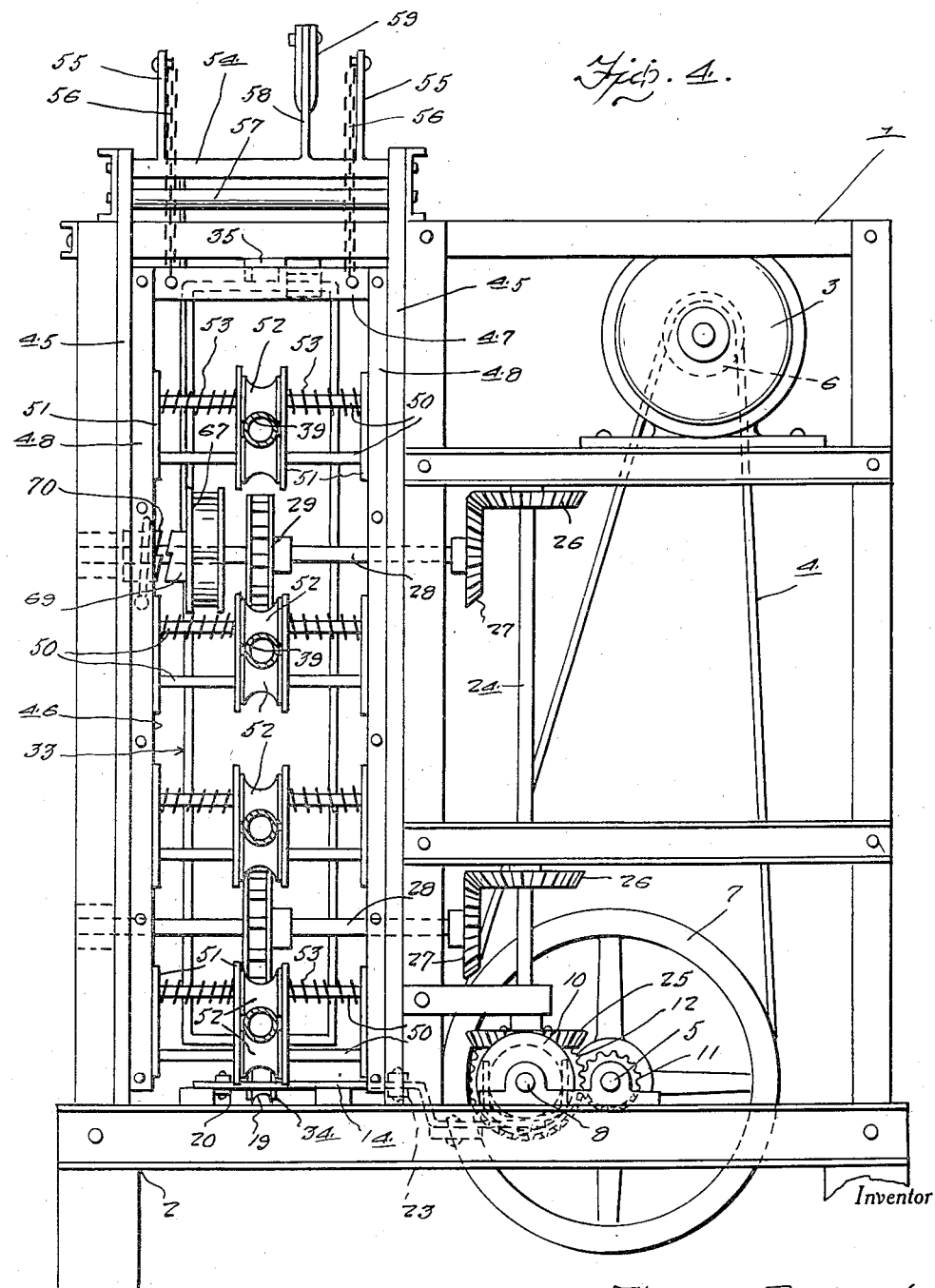

Aug. 14, 1934.  T. P. MORRISON  1,970,053
FURNACE RETORT CLEANING MACHINE
Original Filed April 15, 1932  9 Sheets—Sheet 5
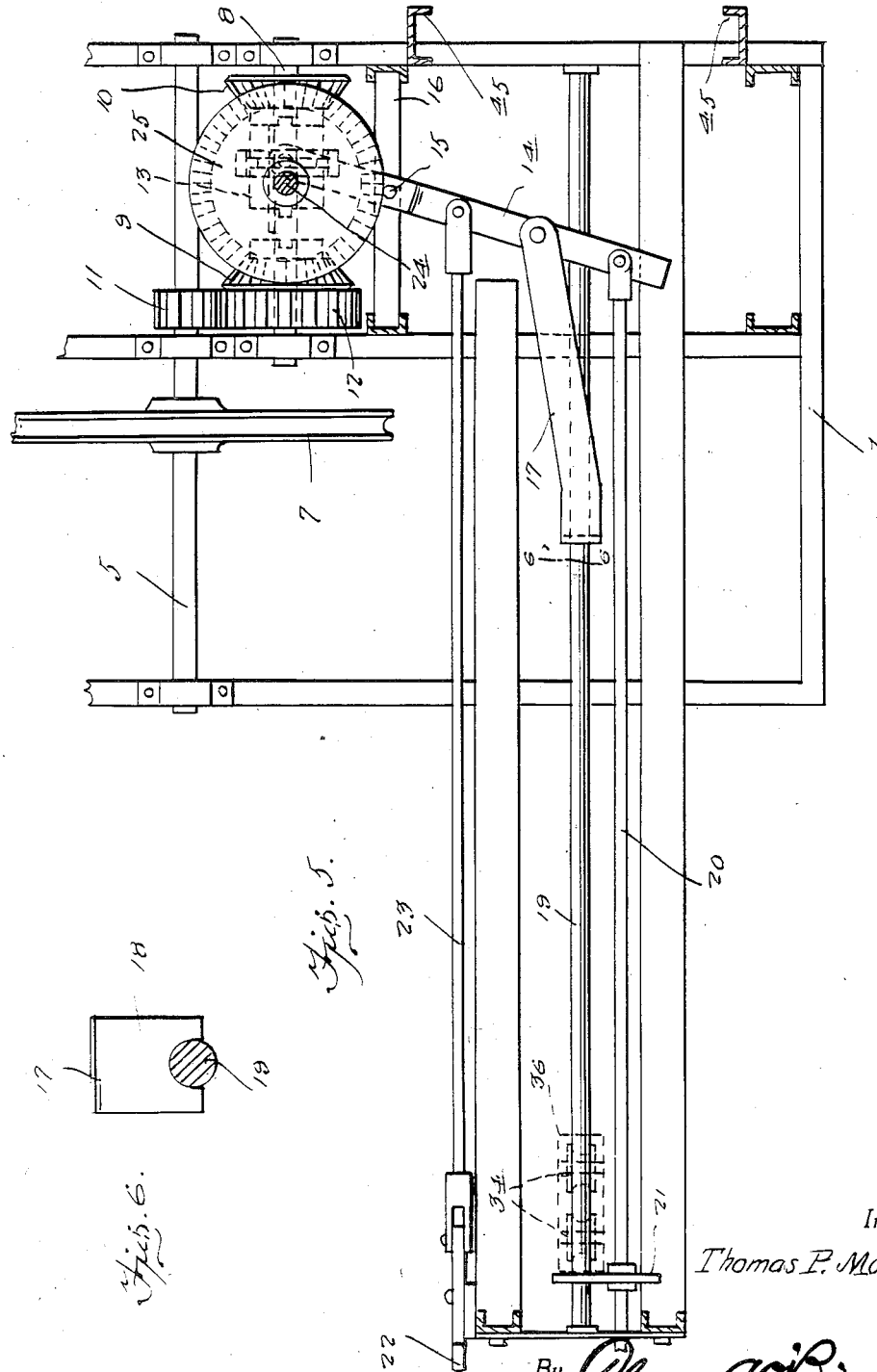

Aug. 14, 1934.   T. P. MORRISON   1,970,053
FURNACE RETORT CLEANING MACHINE
Original Filed April 15, 1932   9 Sheets-Sheet 6
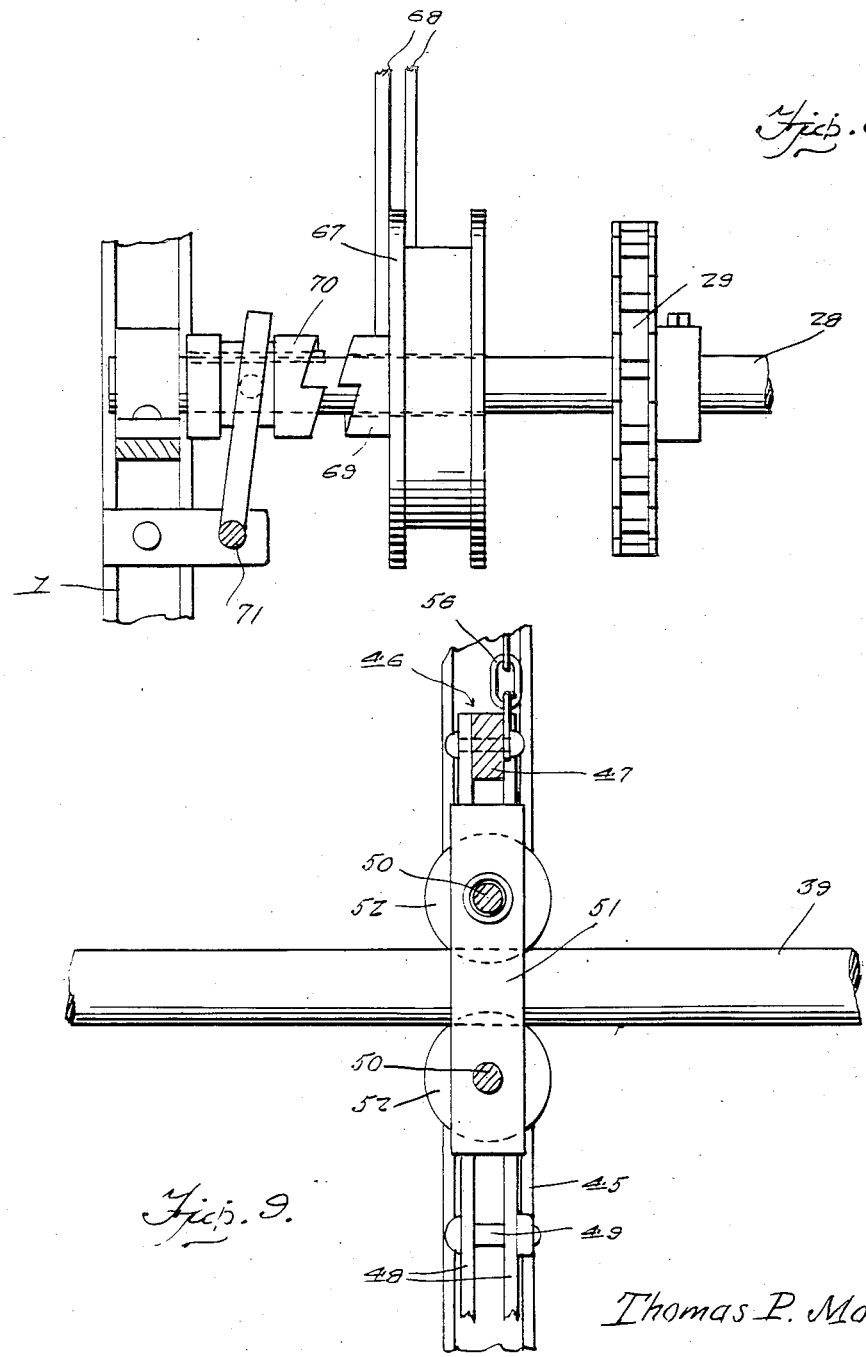
Inventor
*Thomas P. Morrison*
By *Clarence A. O'Brien*
Attorney

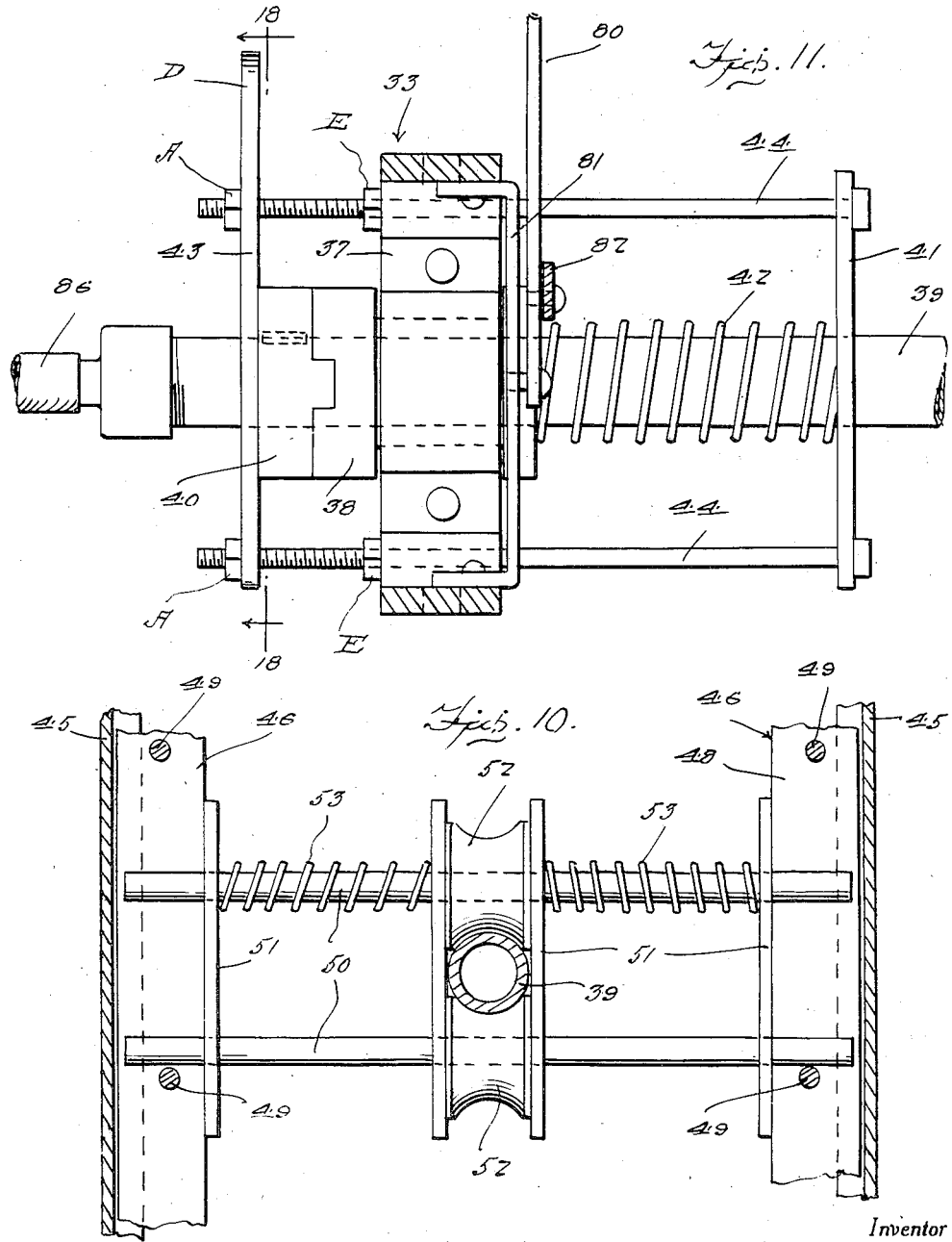

Aug. 14, 1934.  T. P. MORRISON  1,970,053
FURNACE RETORT CLEANING MACHINE
Original Filed April 15, 1932   9 Sheets-Sheet 8
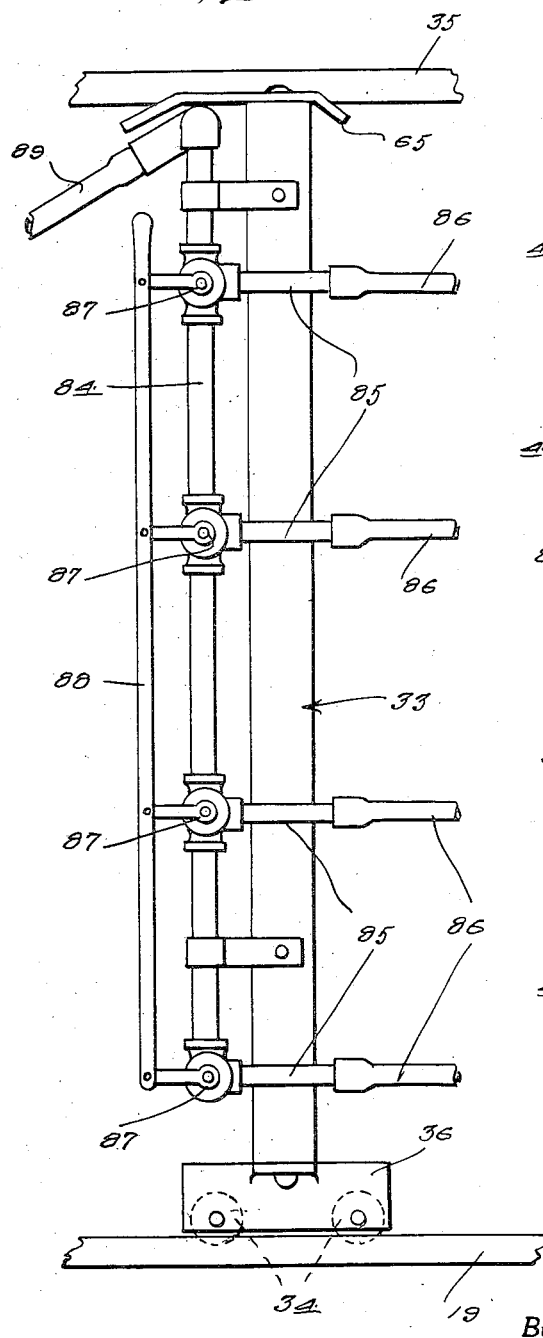
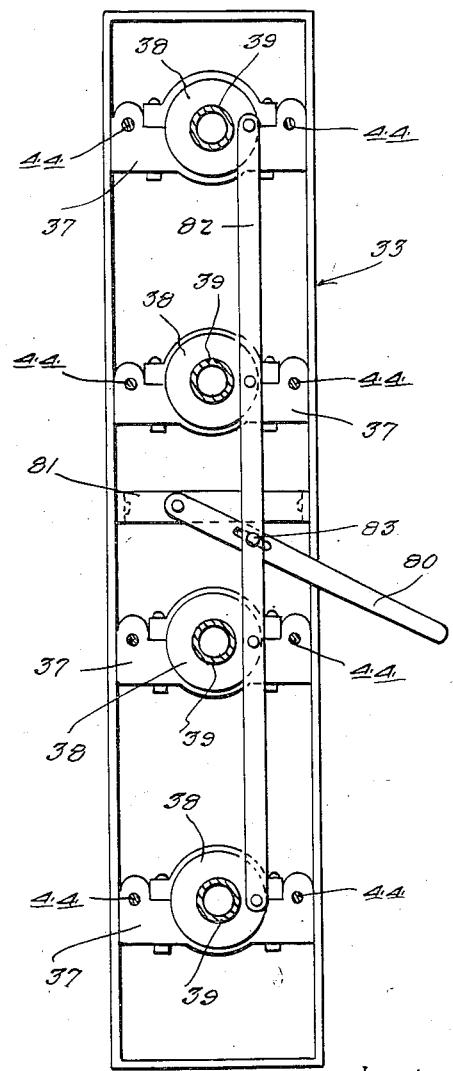
Inventor
Thomas P. Morrison
By Clarence A. O'Brien
Attorney

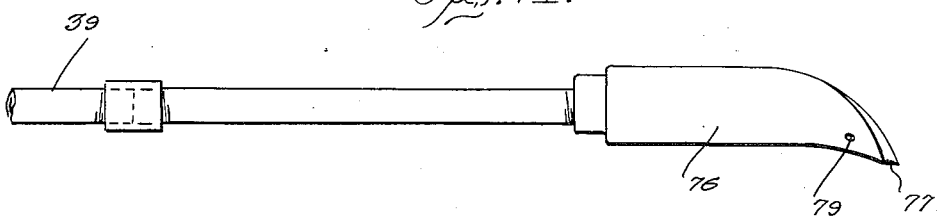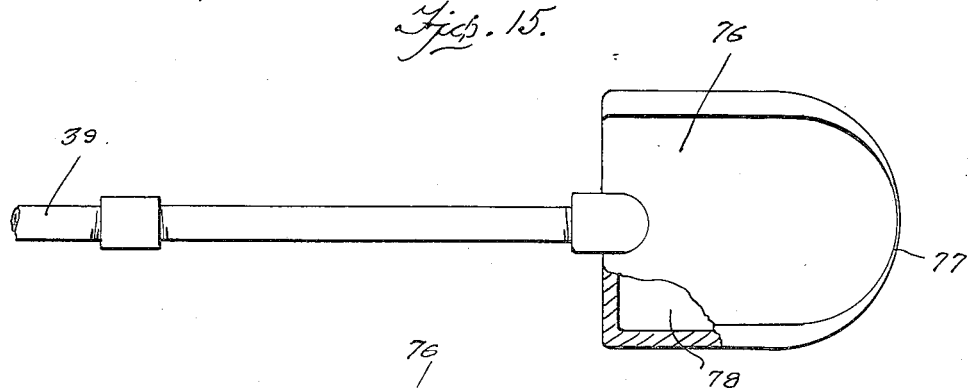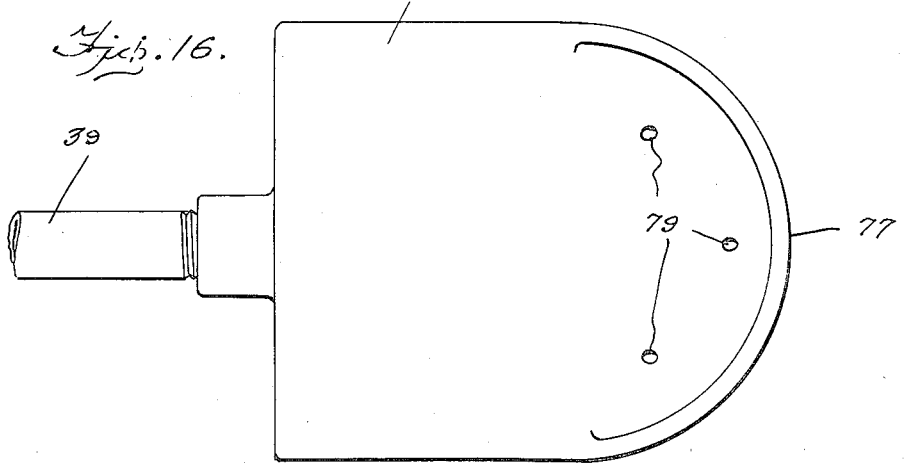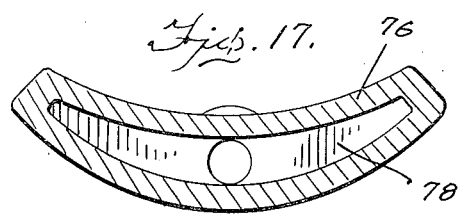

Patented Aug. 14, 1934

1,970,053

UNITED STATES PATENT OFFICE 1,970,053

FURNACE RETORT CLEANING MACHINE

Thomas P. Morrison, Blackwell, Okla.

Application April 15, 1932, Serial No. 605,543
Renewed January 17, 1934

8 Claims. (Cl. 214—24)

The present invention relates to a furnace retort cleaning machine and has for some of its objects to provide, in a manner as hereinafter set forth, a machine of this character which will be simple in construction, strong, durable, efficient and reliable in operation, and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:—

Figure 1 is a view in side elevation of the machine with the scrapers being moved into the furnace, as indicated by the arrow.

Figure 2 is a view in side elevation showing the position of the various parts as the scrapers or shovels are being withdrawn from the furnace.

Figure 3 is a view in top plan of the machine.

Figure 4 is a view in front elevation of the machine, showing the shovel supporting tubes in section.

Figure 5 is a view in horizontal section through a lower portion of the machine, showing the automatic clutch shifting means.

Figure 6 is a detail view in section, taken substantially on the line 6—6 of Figure 5.

Figure 7 is a detail view in vertical longitudinal section showing the means for releasably securing the shovels in raised position.

Figure 8 is a detail view of the clutch through the medium of which the shovels are raised.

Figure 9 is a view in vertical section through a forward portion of the machine showing the floating shovel supporting means.

Figure 10 is a view in vertical section taken substantially at right angles to Figure 9.

Figure 11 is a view in horizontal section showing the rear shovel supporting means.

Figure 12 is a detail view in side elevation showing a valve controlled fluid supply manifold for the shovels.

Figure 13 is a view in vertical transverse section, showing the means for manually rotating the shovels simultaneously.

Figure 14 is a detail view in side elevation of one of the shovels.

Figure 15 is a view principally in top plan and partially in horizontal sections of one of the shovels.

Figure 16 is a bottom plan view of one of the shovels.

Figure 17 is a detail view in vertical transverse section through one of the shovels.

Figure 18 is a view in vertical transverse section, taken substantially on the line 18—18 of Figure 11.

Referring now to the drawings in detail, it will be seen that the embodiment of the present invention which has been illustrated comprises a supporting structure or frame 1 which is mounted on a suitable base 2. Mounted on an upper portion of the frame 1 is an electric motor 3 which is operatively connected by a belt 4 to a shaft 5 which is journaled longitudinally in bearings provided therefor on a lower portion of the frame 1. The belt 4 is trained over a pulley 6 on the armature shaft of the motor 3 and over comparatively large pulley 7 which is fixed on the shaft 5.

Also journaled on a lower portion of the frame 1 adjacent to and parallel with the shaft 5 is a clutch shaft 8 having oppositely disposed beveled gears 9 and 10 loosely mounted thereon. A gear 11 fixed on the shaft 5 is engaged with a comparatively large gear 12 fixed on the clutch shaft 8 for actuating said clutch shaft. A clutch 13 is splined on the shaft 8 and is engageable selectively with the gears 9 and 10 for operatively connecting said gears to said shaft 8. Of course, the gears 9 and 10 are provided with means for engagement by the clutch 13.

A clutch shifting lever 14 is pivotally mounted at an intermediate point, as at 15, on a supporting bar 16 provided therefor on the frame 1. The lever 14 is, of course, operatively connected at one end with the clutch 13. A bar 17 is pivotally connected, at one end, to the lever 14 and terminates, at its other end in a downturned notched portion 18 which rests slidably on a longitudinally extending carriage supporting rod on a lower portion of the frame. A rod 20 is also pivotally connected, at one end, to the lever 14 and has adjustably mounted on its other end portion an abutment 21 which rests slidably on the rod 19. It may be well to set forth that the abutment 21 and the opposed portion 18 of the bar 17 provides means engageable by the shovel operating carriage to be presently described for shifting the clutch in opposite direction on completion of the inward and outward strokes of the shovels.

The clutch may be manually shifted when desired through the medium of a hand lever 22 which is pivotally mounted on one end portion of the frame 1 and operatively connected to the clutch lever 14 by the rod 23.

A vertical shaft 24 is journaled in bearings provided therefor on the frame 1 and has fixed on its lower end portion a beveled gear 25 which is constantly in mesh with the gears 9 and 10. Also, fixed on the shaft 24 are the vertically spaced beveled gears 26 which are engaged with beveled gears 27 fixed on the adjacent end portions of the horizontal, transverse shafts 28 which are journaled in the bearings provided therefor on the frame 1. Sprocket gears 29 are fixed on the shafts 28. Similar sprocket gears 30 are mounted on shafts 31 which, in turn, are mounted in bearings provided therefor on the rear portion of the frame 1. Sprocket chains 32 are trained over the sprocket gears 29 and 30 and have their ends connected to opposite sides of a carriage which is designated generally by the reference numeral 33. The carriage 33 is mounted for horizontal reciprocation in the frame 1 and to this end is provided with the grooved rollers 34 on its lower end which travel on the rod 19. The upper end portion of the carriage is slidably engaged in an inverted channel-shaped guide 35 which is mounted longitudinally on the frame 1. The supporting rollers 34 of the carriage 33 are journaled in a housing 36 which is engageable with the abutments 21 and 18 for shifting the clutch 13. As best seen in Figure 13 of the drawings, the carriage 33 is of substantially rectangular, skeleton form.

Mounted for rocking movement in the carriage 33 are the vertically spaced bearings 37 having rotatably mounted therein the clutch members 38, said clutch members 38 being tubular in form and having external flanges on their ends engaged with the bearings 37. Extending through the tubular clutch members 38 are the shovel supporting pipes 39 having fixed on their rear end portions the clutch members 40 which are engageable with the clutch member 38, thus connecting the pipes 39 to the clutch members 38 for rotation therewith. Plates 41 are slidably mounted on the pipes 39 forwardly by the coil springs 42 which encircle the pipes 39 and having one end bearing against the members 38 and their other ends engaged with said plates 41. Transverse bars 43 are mounted on the rear end portions of rods 44, as best seen in Figures 11 and 18 of the drawings. The rods 44 have headed forward ends anchored in the end portions of the plates 41, said rods extending slidably through the bearings 37 and having threaded rear end portions upon which the nuts A are threaded and engaged with the bars 43. The bars 43 extend across the pipes 39 and are provided with recesses or notches B for the reception of said pipes. The bars 43 are further provided with notches or recesses C which receive the rods 44. The bars 43 terminate, at one end, in handles D which provide means for facilitating the removal of said bars when desired. Also, threaded on the rods 44 are stop nuts E which are engageable with the bearings 37 for limiting the forward movement of said rods 44 under the influence of the springs 42. Thus, the clutch members 40 are yieldingly urged against the clutch members 38.

Mounted vertically on the forward end portion of the frame 1 are the spaced, opposed channel guides in which a shovel raising and lowering frame 46 is slidably mounted. The frame 46 includes an upper cross member 47 from which depend the spaced, opposed pairs of side members 48 between which the connecting and spacing bolts 49 extend. Slidably engaged between the pairs of side members 48 are the end portions of the vertically spaced pairs of transverse rods 50. Links 51 are slidably mounted on the rods 50 for connecting the pairs of said rods together. Grooved rollers 52 are journaled on the rods 50. The pipes 39 extend between the pairs of rollers 52 and the forward end portions of said pipes are thus provided with a floating mounting on the vertically adjustable frame 46. The bolts 49 limit the movement of the rods 50 relative to the side members 48 of the frame 46. Expansion springs 53 are mounted on the uppermost of each pair of rods 50 and yieldingly urge the outermost links 51 against the side members 48 and the innermost links against the rollers 52.

A rocker shaft 54 is journaled transversely on an upper forward portion of the frame 1 and has extending therefrom the arms 55. Chains 56 connect the arms 55 to the frame 46. The chains 56 travel over a tubular roller 57 which is journaled transversely on an upper forward portion of the frame 1. Another arm 58 is fixed on the rocker shaft 54 and has pivotally connected thereto a latch bar 59. The latch bar 59 has mounted on its outer end portion a substantially channel shaped member 60 which is slidably engaged with a channel-shaped arm 61 which is secured, at one end, to the frame 1. The arm 61 is provided with a free end having a longitudinal notch 62 therein for the reception of a detent 63 which is formed on the latch bar 59. A roller 64 is journaled in the lower portion of the member 60 for engagement by a cam 65 on the upper end of the carriage 33.

Another arm 66 is fixed on the rocker shaft 54 and is connected to an arm 67 which is loosely mounted on the uppermost shaft 28 by the links 68. Fixed to the outer side of the arm 67 and encircling the uppermost shaft 28 is a clutch member 69. A shiftable clutch member 70 is splined on the uppermost shaft 28 and is engageable with the clutch member 69 for connecting the arm 67 to said uppermost shaft 28 for actuation in one direction thereby. A longitudinally extending rocker shaft 71 is journaled on the frame 1 and operatively connected to the clutch 70. A spring 72 is connected to the rocker shaft 71 for normally maintaining the clutch member 70 in disengaged position. An arm 73 is fixed on the shaft 71 and has journaled thereon a roller 74 which is engageable by a cam 75 mounted on one side of the carriage 33. Thus, when the carriage 33 has substantially completed its travel in a rearward direction, the rocker shaft 71 is actuated to engage the clutch member 70 with the clutch member 69.

Shovels 76 are mounted on the forward ends of the pipes 39 and are provided with the downwardly curved lip or blade portions 77. The shovels 76 are of arcuate transverse section, as clearly seen in Figure 17 of the drawings, and are formed to provide the chambers 78 having communication with the pipes 39. The shovels 76 are further provided, in their lower sides, with the outlet ports 79.

As illustrated to advantage in Figures 11 and 13 of the drawings, the shovels 76 are manually rotatable in unison through the medium of a hand lever 80 which is pivotally mounted on a supporting bar 81 on the carriage 33. A vertical bar 82 is pivotally connected to the clutch members 38 and is operatively coupled to the lever 80 by a pin and slot connection 83.

A manifold 84 is mounted vertically on one side of the carriage 33 and has its branches 85 connected to the rear ends of the pipes 39 by the flexible conduits 86. Valves 87 control the manifold branches 85 and are operable in unison through the medium of a bar 88. The manifold 84 is connected with a source of fluid supply by a flexible conduit 89.

In use, the clutch 13 is engaged with the gear 10 and the carriage 33 is moved forwardly by the motor 3 to project the shovels 76 into the retorts of the furnace. During this operation, the vertically shiftable frame 46 is in lowered position, thus supporting the pipes 39 at an inclination, as seen in Figure 1 of the drawings. It will also be seen that the shovels 76 are in lowered position as said shovels move into the retorts. As the carriage approaches the end of its forward stroke, the casing 36 engages the abutment 18 on the bar 17 and actuates the lever 14 to shift the clutch 13 into engagement with the beveled gear 9. This, of course, reverses the direction of travel of the carriage 33. As the carriage moves outward the shovels are withdrawn from the retorts. As the carriage 33 approaches the limit of its outward movement, the cam 75 engages the roller 74 on the arm 73 and rocks the shaft 71 in a manner to engage the clutch member 70 with the clutch member 69, thereby operatively connecting the arm 67 to the uppermost shaft 28. The arm 67 is swung downward and, through the medium of the links 68, rocks the shaft 54 in a direction to raise the frame 46, thus lifting the pipes 39 and the shovels 76 to a horizontal position, as seen in Figure 2 of the drawings. When the rocker shaft 54 is thus actuated, the latch bar 59 slides rearwardly on the arm 61 until the detent 63 drops into the notch 62 in said arm 61. The shovels 76 may then be dumped by rotating said shovels through the medium of the hand lever 80. As the carriage 33 continues outward, the casing 36 engages the abutment 21 and actuates the lever 14 through the medium of the rod 20 for shifting the clutch 13 again into engagement with the beveled gear 10. The carriage 33 then begins another forward or inward movement and as it does so, the cam 65 engages the roller 64 and, through the medium of the member 60 raises the latch bar 59 sufficiently to disengage the detent 63 from the notch 62 in the arm 61. The frame 46 then drops by gravity to its lowered position and the shovels are thus again in lowered position. This operation is repeated as many times as may be desired or necessary.

A suitable fluid, preferably steam is supplied from a suitable source to the manifold 84 through the flexible conduit 89. The steam travels through the branches 85 of the manifold, being controlled by the valves 87 and enters the pipes 39 through the flexible conduits 86. The steam then travels through the conduits 39 into the chambers 78 of the shovels 76 and is discharged in jets beneath said shovels through the ports 79.

Should it be desired to render one or more of the shovels inoperative as when a bad retort or retorts is present in the furnace, this may be conveniently accomplished by removing the plates 43 and disconnecting the conduits 86 which couple the pipes 39 upon which said shovels are mounted to the manifold 84. Then, by disconnecting the corresponding valves 87 from the bar 88, the supply of fluid to the branches 85 to which the disconnected conduits 86 are attached may be shut off. In this manner, the shovels which are to be rendered inoperative are disconnected from the carriage 33 and will remain stationary.

It is believed that the many advantages of a furnace retort cleaning machine constructed in accordance with the present invention will be readily understood, and although the preferred embodiment of the invention is as illustrated and described, it is to be understood that changes in the details of construction and in the combination and arrangement of parts may be resorted to which will fall within the scope of the invention as claimed.

What is claimed is:—

1. A furnace retort cleaning machine comprising a supporting structure, a carriage mounted for reciprocation on the supporting structure, supporting members pivotally connected to the carriage for movement therewith, shovels on said supporting members, means for actuating the carriage, and means controlled by the carriage for raising and lowering the shovels.

2. A furnace retort cleaning machine comprising a supporting structure, a carriage mounted for reciprocation on the supporting structure, means for actuating the carriage, supporting members pivotally connected to the carriage for movement therewith, shovels on said supporting members, a frame mounted for vertical adjustment on the supporting structure and engaged with the supporting members for raising and lowering the shovels, and means controlled by the carriage for lifting the frame.

3. A furnace retort cleaning machine comprising a supporting structure, a carriage mounted for reciprocation on the supporting structure, means for actuating the carriage, supporting members pivotally connected to the carriage for movement therewith, shovels mounted on the supporting members, vertically shiftable means on the supporting structure engaged with the supporting members for raising the shovels, and clutch controlled means for connecting the shovel raising means to the carriage actuating means for actuation thereby.

4. A furnace retort cleaning machine comprising a supporting structure, a carriage mounted for reciprocation on the supporting structure, means for actuating the carriage, supporting members pivotally connected to the carriage for movement therewith, shovels mounted on the supporting members, a frame mounted for vertical sliding movement on the supporting structure and engaged with the supporting members for lifting the shovels, means for releasably connecting the frame to the carriage actuating means for actuation thereby, the last named means including a clutch, and means for releasing the clutch.

5. A furnace retort cleaning machine comprising a supporting structure, a carriage mounted for reciprocation on the supporting structure, means for actuating the carriage, supporting members pivotally connected to the carriage for movement therewith, shovels on the supporting members, a vertically shiftable frame mounted on the supporting structure, means connecting the supporting members to the frame for substantially universal swinging movement, and means for releasably connecting the frame to the carriage actuating means for actuation thereby in a manner to lift the shovels.

6. A furnace retort cleaning machine comprising a supporting structure, a carriage mounted for reciprocation on the supporting structure, means for actuating the carriage, supporting members pivotally connected to the carriage for movement therewith, shovels on the supporting members, a vertically shiftable frame mounted on the supporting structure, means connecting the supporting members to the frame for substantially universal swinging movement, means for releasably connecting the frame to the carriage actuating means for actuation thereby in a manner to lift the shovels, the frame actuating means including a clutch, and means for disengaging the clutch and releasing the frame from the carriage actuating means.

7. A furnace retort cleaning machine comprising a supporting structure, a carriage mounted for reciprocation on the supporting structure, pipes pivotally connected to the carriage for movement therewith, shovels mounted on the pipes having chambers therein communicating with the pipes, said shovels further having discharge ports therein communicating with the chambers, means for actuating the carriage, and means for connecting the pipes to a source of fluid supply, the last named means including a manifold mounted on the carriage, flexible conduits connecting the branches of the manifold to the pipes, valves controlling the manifold branches, and a flexible conduit extending from the manifold to the source of fluid supply.

8. A furnace retort cleaning machine comprising a supporting structure, a carriage mounted for reciprocation on the supporting structure, clutch controlled means for actuating the carriage in opposite directions, means operable by the carriage for shifting the clutch controlled actuating means, supporting members connected to the carriage for movement therewith, and shovels mounted on the supporting members.

THOMAS P. MORRISON.